United States Patent [19]

Cholet et al.

[11] Patent Number: 4,850,451
[45] Date of Patent: Jul. 25, 1989

[54] DEVICE FOR GENERATING IN THE GROUND BOTH TRANSVERSE AND LONGITUDINAL ACOUSTIC WAVES IN A PLURALITY OF DIFFERENT DIRECTIONS

[75] Inventors: Jacques Cholet, L'Etang-La-Ville; Pierre-Claude Layotte, Les Mathes, both of France

[73] Assignee: Institut Francais du Petrole, Rueil-Malmaison, France

[21] Appl. No.: 136,936

[22] Filed: Dec. 23, 1987

[30] Foreign Application Priority Data

Dec. 23, 1986 [FR] France ................................ 86 18031

[51] Int. Cl.⁴ .............................................. G01V 1/04
[52] U.S. Cl. .................................... 181/114; 181/121; 367/75
[58] Field of Search ................ 181/113, 114, 119, 121, 181/400, 401; 367/75

[56] References Cited

U.S. PATENT DOCUMENTS

| 4,390,077 | 6/1983 | Fulkerson | 181/121 |
| 4,564,083 | 1/1986 | Layotte et al. | 181/114 |
| 4,660,674 | 4/1987 | Airhart | 181/113 |
| 4,721,181 | 1/1988 | Airhart et al. | 181/114 |
| 4,799,572 | 1/1989 | Airhart | 181/114 |

FOREIGN PATENT DOCUMENTS

| 0101331 | 8/1984 | European Pat. Off. . |
| 0230372 | 7/1987 | European Pat. Off. . |
| 2276599 | 1/1976 | France . |

Primary Examiner—Deborah L. Kyle
Assistant Examiner—J. Woodrow Eldred
Attorney, Agent, or Firm—Antonelli, Terry & Wands

[57] ABSTRACT

A device for generating in the ground longitudinal and transverse acoustic waves by a mass striking a target element coupled with the surface of the ground. The target element is recessed in a central part thereof and have an inner wall slanted with respect to the vertical in the form of, for example, a truncated cone. The mass is fixed to the end of an arm pivoting with respect to a support structure in the form of a parallelepipedic cage, which is movable by a cylinder between a high transport position and a low position in which the target element is coupled with the ground a drive causes raising of the mass by pivoting the arm with the geometry of the assembly being calculated so that the mass strikes the inner slanting faces perpendicularly thereto, and thus creates both P and S waves.

13 Claims, 5 Drawing Sheets

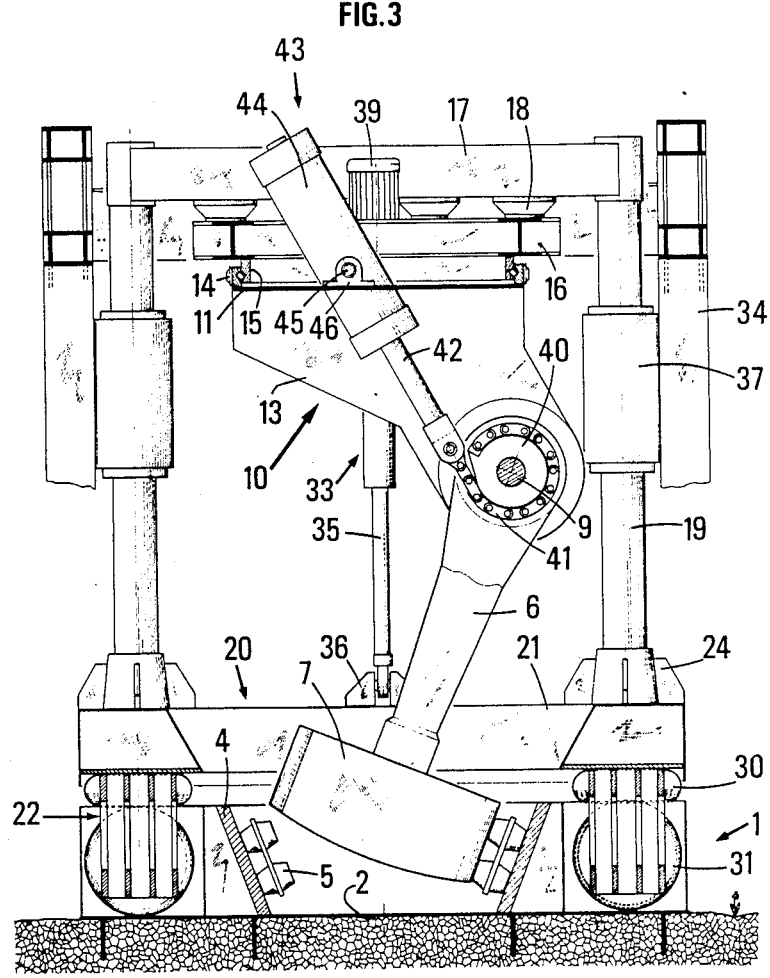

DEVICE FOR GENERATING IN THE GROUND BOTH TRANSVERSE AND LONGITUDINAL ACOUSTIC WAVES IN A PLURALITY OF DIFFERENT DIRECTIONS

BACKGROUND OF THE INVENTION

1. Field of the Invention

The invention relates to an improved device for generating in the ground both transverse and longitudinal acoustic waves in a plurality of different directions, useful in particular in the field of seismic prospection.

In seismic prospection, determining the position of the reflecting layers of the subsoil is often effected by transmitting into the ground longitudinal acoustic waves (P) which propagate in a compression mode. But transverse waves (S) are also used which propagate in a distortion or shearing mode. The transverse waves permit interesting applications. Since their wave length is, for equal frequencies, less than that of the longitudinal waves they have a better separating power. Furthermore, as is well known by specialists, the comparison of recordings obtained by transverse waves having different polarization directions makes it possible to detect fractures oriented in the subsoil and so new possibilities of interpretation.

2. Description of the Prior Art

A known device, adapted for generating transverse acoustic waves in the ground, is described in, for example French Pat. No. 2,276,599. It comprises essentially a target element having a surface for application on the ground and at least one lateral striking surface perpendicular to the application surface, a mass for striking the target element, an arm pivoting with respect to a platform for supporting the mass and operating means for causing the arm to pivot with respect to the platform between a low position in which the mass comes into contact with the lateral striking surface and a top position.

Lifting means fixed to a vehicle make it possible to move the target element between a transport position and a low position in which the application surface is in contact with the ground. With the target element disposed on the ground, the mass, previously raised by pivoting the arm, is released and strikes the lateral surface of the target element in a direction substantially parallel to the surface of the ground. Due to the shock, transverse acoustic waves are transmitted into the ground.

In French Pat. No. 2,530,344 an improvement to the preceding device is described in which the target element, the platform supporting the shaft of the pivoting arm and the operating means are connected to a rigid cage associated with guide means fixed to the chassis of the vehicle and movable in translation with respect thereto between a first working position in which the target element is in contact with the ground and a second raised position. Drive means make it possible to move the rigid cage with respect to the chassis between the first and the second positions and to press the target element against the ground in the working position.

The rigid cage has for example columns adapted for sliding vertically with respect to the chassis of the vehicle, with these columns being interlocked together by a first rigid structure supporting the platform and the operating means and a second rigid structure connected to the target element by deformable coupling means.

With the target element, the arm associated with the mass and the means for operating the arm connected to a rigid cage movable between a position in which the target element is pressed against the ground, this anchorage force being for example at least a part of the weight of the vehicle, and a raised position making it possible to move the vehicle, with the time interval separating two successive tripping operations at two different positions, being thus considerably reduced.

Furthermore, the striking faces are inner faces of the target element and the pivoting arm, the platform and the operating means are adapted so that the movements of the mass are circumscribed in a volume defined by the cage and the chassis of the vehicle. This arrangement makes it possible to limit the lateral dimension of the working zone and to prevent the access of staff inside the zone of movement of the mass during operation of the device.

Such a device is adapted for creating pure transverse waves and does not lend itself well to applications in which P and S wave seismic recordings are made.

From the U.S. Pat. Nos. 4,291,780 and 4,390,077, a device is known for applying pulses to the ground in an oblique direction so as to generate both longitudinal and transverse waves.

These pulses are generated by the impact of a mass falling with a rectilinear movement towards an impact face inclined with respect to the vertical of a target element coupled to the ground or towards another diametrically opposite face. The mass is guided in its fall by the parallel uprights of a guide mast orientable with respect to the target element. The impact speed of the mass is maximum when the mast is vertical, that is to say for the production of compression waves and decreases when it is slanted. Since the friction forces of the mass against the guide mast increase with the slant, it becomes more difficult to forecast with duration of the fall and so the precise moment of impact. Now, for numerous applications, the slant angle of the guide mast necessary so as to obtain a suitable amplitude ratio between the S and P waves, must reach high values. This operating condition is unfavorable to good synchronization.

SUMMARY OF THE INVENTION

The device of the present invention is adapted for generating in the ground acoustic waves of the P type and the S type by impact of a mass on a target element in directions greatly slanted with respect to the vertical.

It comprises a target element with a face for application on the ground and an inner striking wall, a mass for striking the target element on the inner wall, an arm pivoting with respect to a turret for supporting the mass and operating means for causing the arm to pivot with respect to the platform between a low position and a high position in which the mass comes into contact with the inner striking wall. The target element, the turret and the operating means are connected to a rigid cage associated with guide means fixed to the chassis of the vehicle and movable in translation with respect thereto between a first working position in which the target element is in contact with the ground and a second raised position, with the device having drive means for moving the rigid cage with respect to the chassis between the first and second positions and for pressing the target element against the ground in the working position.

It is characterized in that the inner striking wall is slanted with respect to the vertical and includes a plurality of slanted faces oriented differently with respect to each other, with the device also including rotational means for causing the platform to rotate with respect to the target element, and for bringing the pivoting plane of the arm perpendicularly to each of the slanted inner faces, and with the pivoting shaft of the arm being positioned so that the mass in the low position strikes the inner wall perpendicularly.

The target element may advantageously have an inner recess in the form of a truncated cone and adapted for receiving impacts of the mass at any position on its inner periphery.

At each chosen position of a seismic profile, both P and S waves are emitted. The polarization plane of the waves may be changed rapidly by bringing the pivoting arm, through rotation of the platform, into a plane perpendicular to another of the oblique striking faces of the target element.

The simultaneous emission of P and S waves results in an appreciable saving of time and so a considerable reduction of the cost of a campaign for exploring along a profile. The falling mass, by pivoting of a support arm, strikes the target element with very great force through a high angle of incidence, with very low energy dissipation through friction. This makes it possible to obtain S waves of a higher amplitude than that of the P waves emitted at the same time, which is very favorable for numerous applications. Since the friction is low, no unforeseeable delay can be observed in the fall of the mass. The moment of impact may then be determined accurately. The synchronization of several emission devices such as this one, tripped simultaneously or in sequence, is much simpler for this reason.

The use of a target element whose inner recess has a truncated cone shape makes it possible to apply polarized S waves in the ground in any desired direction. Since orientation of the polarization plane may be accurately fixed, on site operations are greatly facilitated.

BRIEF DESCRIPTION OF THE DRAWINGS

Other features and advantages of the device will be clear from reading the description of the preferred embodiment, chosen by way of non limitative example, with reference to the accompanying drawings in which:

FIG. 3 shows a transverse view in partial section of the device in which the pivoting plane of the arm is rotated through 90° with respect to the preceding Figs.;

DETAILED DESCRIPTION OF THE INVENTION

Figure 5:
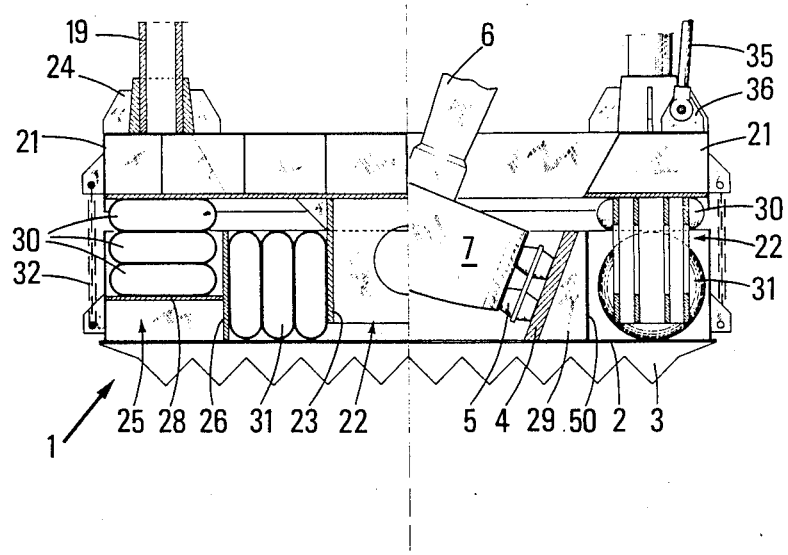
FIG. 5 shows the target element of FIG. 4, seen from the side in half section through A-B.
Figure 4:
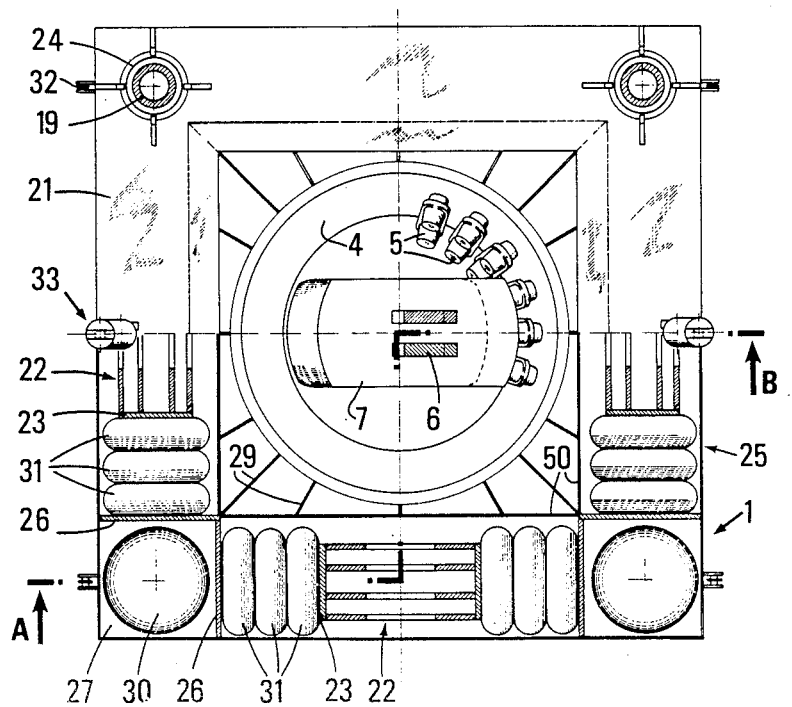
FIG. 4 shows the target element in a top view with a half section showing the arrangement of the shock absorbing means.

The device shown in FIGS. 1 to 5 includes a target element generally designated by the reference numeral 1, of square or rectangular shape, having a recess in its central part and formed of a rigid assembly of metal plates and beams which will be described in greater detail with reference to FIGS. 4 and 5. The target element has a face or base plate 2 for application on the ground, coupling elements 3, formed of points or projections, may be optionally fixed to the application wall, so as to increase the coupling coefficient of the target element 1 with the ground.

Figure 2:
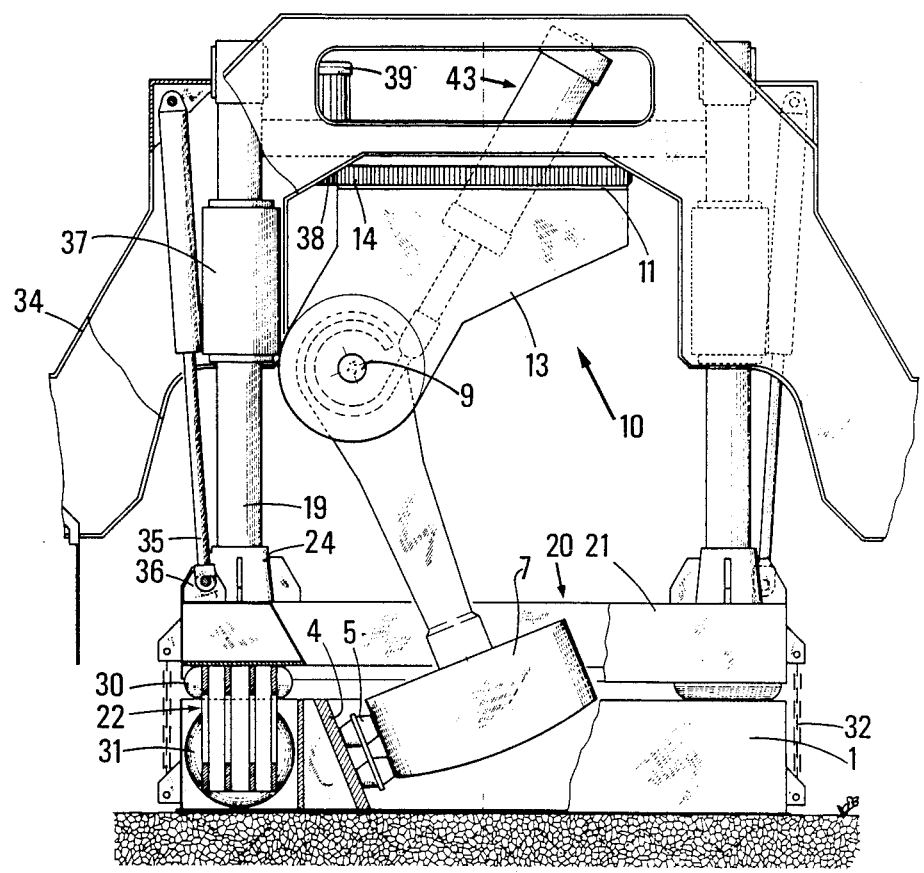
FIG. 2 shows, reduced to its central part, a view similar to FIG. 1 in which the pivoting plane of the arm is parallel to the longitudinal axis of the vehicle and in which the target element is in the working position coupled with the ground.

As shown most clearly in FIG. 2, target element 1 includes at least one inner slanted striking wall 4 slanted with respect to the vertical. The slant angle is chosen as a function of the relative amplitude of the P and S waves which it is desired to obtain. It has for example a value of the order of 20° to 30°.

Shock absorbing elements 5 (FIGS. 2, 3) are fixed against the at least one inner slanted striking or impact wall 4.

Figure 1:
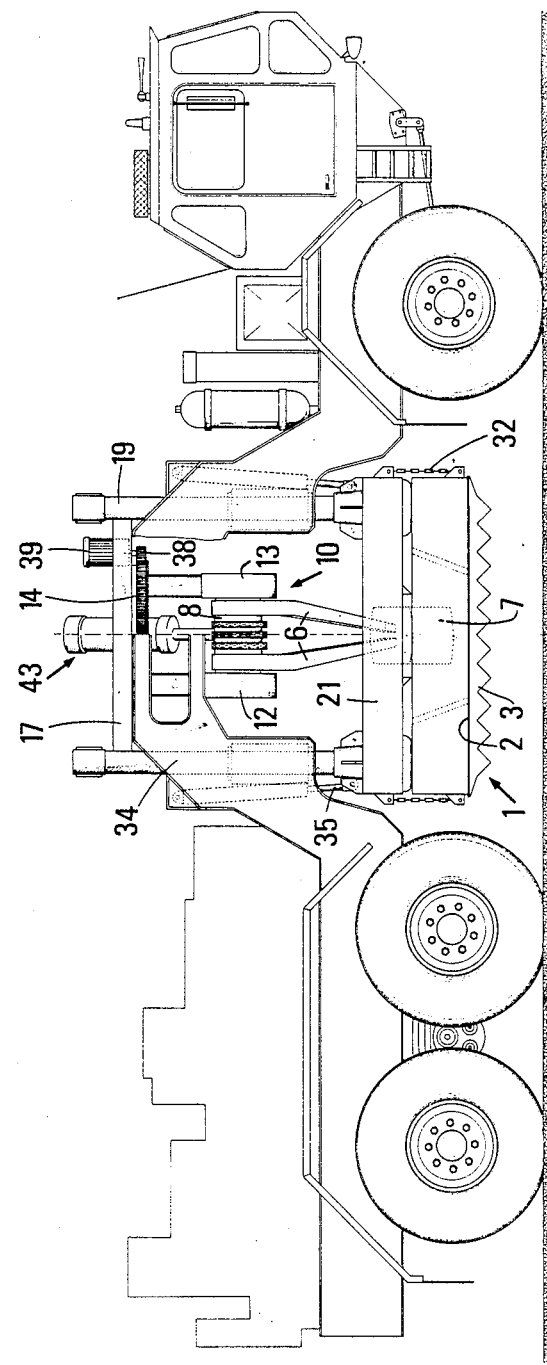
FIG. 1 shows a general view of the device associated with the vehicle, the rigid cage supporting the target element, the arm, the turret and the operating means, being in the raised position.

The device also includes an arm 6 formed of elongate elements spaced apart from each other (FIG. 1). Arm 6 may be rigid or have a certain flexibility. A first end of each of the elements of arm 6 is fixed to a mass 7. The opposite ends of these same elements are joined together by a cylindrical part 8 (FIG. 1). A shaft 9, integral, with the arm 6 passes through the two elements thereof and the cylindrical part 8.

The device also includes a turret generally designated by the reference numeral 10 formed of a plate 11 having an annular flange and two support elements or brackets 12, 13 (FIG. 1) perpendicular to the plate 11 and fixed thereto. In a vicinity of the end opposite to the plate 11, the two brackets 12, 13 each have a bearing for the rotational shaft 9 of the arm 6.

Disks (not shown), made from polyurethane for example, are preferably placed between shaft 9 and the brackets 12, 13, for damping the shocks transmitted to the turret 10 at the time of impact.

About the flange of plate 11 and fixed thereto is disposed a crown gear 14 (FIG. 3). The flange of plate 11 may rotate, through ball or roller bearings (not shown), with respect to a ring 15 (FIG. 3). The ring 15 is fixed under a support element 16. A support structure 17 formed by an assembly of beams is disposed above the support element 16 and connected thereto by studs 18 made from a shock absorbing material.

Four columns 19 connect the first support structure generally designated by the reference numeral 17 to a second support structure 20 of square or rectangular shape, itself connected to the target element 1 by shock absorbing means in a manner described hereafter.

The second support structure 20 is formed of a rigid frame made by the assembly of four rigid beams 21 (FIG. 5) joined together in a square or in a rectangle. Under each of the beams 21, towards the middle of their length, are welded ribbed spacers 22 (FIG. 4) having lateral faces 23. To the four corners of the rigid frame are fixed connecting pieces 24 in which the feet of the four columns 19 fit.

The target element 1 is in the form of a rectangular box fixed to a base plate forming, the face or base plate 2 applied against the ground. The box has (FIG. 4) four sides generally designated by the reference numeral 25 whose cross section is in the form of a U. At the four corners of the box, strengthening dividing walls 26, perpendicular to the base plate 2, define four compartments 27. Another dividing wall 28 (FIG. 5) is fixed in these compartments, parallel to the base plate.

In the central recessed part of the box is fixed a truncated cone shaped wall tapering upwardly. This wall forms the inner slanted striking or impact wall 4 already mentioned. Ribs 29 are disposed radially all around the truncated cone shaped wall 4 and are fixed thereto, to the base plate 2 and to the inner walls 50 of the four sides of the box. The shock absorbing elements 5 are fixed against this truncated cone shaped wall.

Shock absorbing means are disposed between the second support structure 20 and the box of the target element 1. The shock absorbing means include deformable enclosures 30 (FIG. 5) disposed in compartments 27 between the horizontal dividing walls 28a and the second support structure 20, and deformable enclosures 31 disposed in the 4 u-shaped sides 25 of the box between the walls 23 of the spacers 22, fixed under the second support structure 20, and respectively the two opposite strengthening walls 26 on each side of the box.

This symmetrical arrangement of the deformable enclosures on each side of the box makes it possible to absorb the shocks transmitted to the second support structure 20 and so to the whole cage by the target element, whatever the direction of application of the impacts of the mass.

The second support structure 20 rests on the box through deformable enclosures 30. Chains 32 connect the deformable enclosures 30 to each other and make it possible for the target element 1 to follow all the vertical movements applied to the cage.

The means for vertically moving the cage include two cylinders 33 whose bodies are fixed to the chassis 34 of the vehicle and whose rods 35 are connected by fixing lugs 36 integral with the second support structure 20 and disposed substantially in the median longitudinal plane of the device.

A hydraulic system (not shown) carried by the vehicle feeds the two cylinders 30 with pressurized liquid.

Four sleeves 37 associated with chassis 34 provide vertical guiding for the four columns 19 when the cylinders 30 are actuated.

The device further comprises a toothed wheel 38 (FIGS. 1, 2) adapted for meshing with the crown gear 14 and rotated by a motor 39 fixed to the first support structure 17 of the cage.

The means for operating arm 6 include therefore three gear wheels 40 (FIG. 1) integral with the cylindrical part 8, three chains 41 meshing with the gear wheels 40 and connected at one of their ends to rod 42 of a cylinder generally designated by the reference numeral 43 whose body is fixed to a shaft 45. Plate 11 of the turret 10 has an opening for the passage of a body 44 of the cylinder 43 and two bearings adapted for supporting the shaft 45 fixed to the cylinder 43.

The dimensions of turret 10 and the length of arm 6 are adapted to the dimensions of the cage and to those of the target element 1, so that the mass 7, in the low position, strikes the slanted wall 4 of the target element 1 perpendicularly thereto, whatever the orientation of the turret 10 relatively to the cage. This makes it possible to choose at will and without limitation the pivoting plane of the arm 6 and so the direction in which the impacts will be applied to the ground.

By causing the stroke of cylinder 43 or the length of chains 41 to vary, the falling height and so the impact force can be modified.

The device functions in the following way:

With the vehicle brought to a position chosen for carrying out seismic "firing" and with the target element 1 in the top position (FIG. 1), the two cylinders 35 are operated so as to cause the rigid cage to move down from the top position (second position) to its low position (first position) in which the target element 1 is applied against the surface of the ground. Preferably, a sufficient hydraulic pressure is applied to the two cylinders 35 so that a part at least of the vehicle, weighs down on the target element 1 in the working position, so as to obtain good acoustic coupling.

Figure 8:
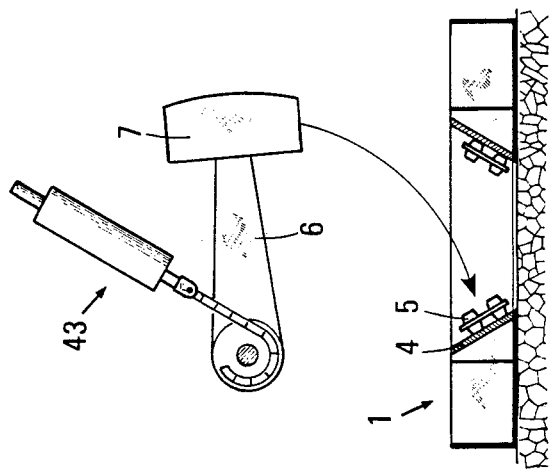
FIG. 8 shows schematically the arm associated with the operating means, in an intermediate position during falling of the mass towards an oblique striking face of the target element.
Figure 7:
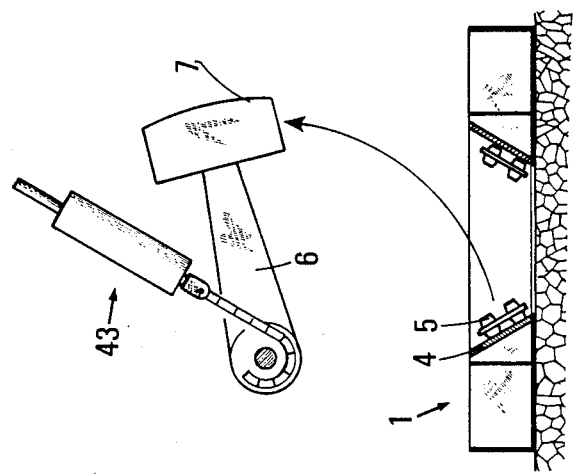
FIG. 7 shows schematically the arm in the top position, the same hydraulic cylinder being in the retracted position.
Figure 6:
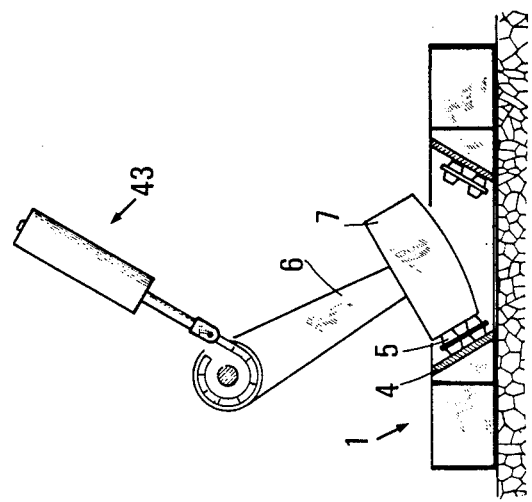
FIG. 6 shows schematically the arm in the low position, the mass being in contact with an oblique striking face of the target element, the hydraulic cylinder forming part of the means for operating the arm being in the extended position.

The motor 39 is actuated so as to rotate turret 10 and bring the pivoting plane of the arm 6 into a given position (FIG. 2 or 6, for example), with arm 6 in the low position, the mass 7 is in contact with the shock absorbing elements 5 of the slanted striking wall 4 of the target element 1. With the rod 42 of the operating cylinder 43 is in its extended position, the cylinder 43 is then actuated so as to retract the rod 42, with the tractive force being transmitted through chains 41 and the arm 6 pivots to its top position (FIG. 7). At the moment chosen for tripping, the cylinder 43 is released and the freed mass obliquely strikes the slanted striking or impact wall 4 (FIG. 8), which generates in the ground both longitudinal and transverse ways.

The different deformable coupling elements, whether it is a question of the different deformable enclosures 30, 31 or of the shock absorbing studs 18, considerably damp the shocks transmitted to the cage and to the chassis of the vehicle.

To completely suppress the retention force of the cylinder 43, which is very low compared with the gravitational force of the mass 7, a cylinder may for example be used such as the one described in the above described French Pat. No. 2,530,244.

With an impact applied in a certain plane (the longitudinal plane for example as shown in FIG. 2), the turret 10 may be rotated through 90° so as to bring it into a transverse plane (FIGS. 1 or 3) or else through 180° so as to obtain secondary waves of opposite polarity. This is not limitative. The pivoting plane of arm 6 may also be brought into any other desired direction for the needs of the seismic prospection because of the truncated cone shape of the inner impact or striking wall for. Then the preceding sequence is repeated.

With the "firing" and seismic data acquisition operations carried out at a given position, the drive means (cylinders 33) are operated so as to bring the cage into the raised position (FIG. 1) and the vehicle is moved to a new chosen position.

In the preferred embodiment, the inner wall of the target element 1 is given a truncated cone shape making it possible to choose the polarization plane of the emitted waves without any limitation. However, without departing from the spirit of the invention, a target element 1 may be used with more limited possibilities. The inner wall 4 may, for example, have a single striking face, two symmetrically disposed striking faces or four striking faces on the four inner sides 25 of the box. More generally, the inner wall of the box will be given the form of a pyramid with polygonal base having n sides offering then n different striking faces.

Still within the scope of the invention, a turret 10 may be used movable vertically with respect to the cage, an arm extendable to a greater or lesser extent and a target element having differently slanted oblique striking faces, so as to vary the slant of the impact directions.

What is claimed is:

1. In an improved device for generating in the ground transverse acoustic waves including a target element with a face for application on the ground and at least one inner slanted striking wall, a mass for striking the target element on said inner slanted striking wall, an arm pivoting with respect to a turret for supporting the mass and operating means for causing the arm to pivot with respect to the turret between a low position and a high position in which the mass comes into contact with the inner striking wall, said target element, said turret and said operating means being connected to a rigid cage associated with guide means fixed to a chassis of a vehicle and movable in translation with respect thereto between a first working position in which the target element is in contact with the ground and a second raised position, the device including drive means for moving the rigid cage with respect to the chassis between the first and second positions and for pressing the target element against the ground in the working position, said inner slanted striking wall is slanted with respect to the vertical and includes a plurality of slanted faces oriented differently with respect to each other, the device further includes rotational means for causing the turret to rotate with respect to the target element, and for bringing a pivoting plane of the arm perpendicularly to each of said slanted faces of said inner slanted striking wall, and deformable coupling means disposed in said target element and about an outer periphery of the inner slanted striking wall for damping horizontal and vertical shocks transmitted by the target element, and wherein a pivoting shaft of the arm is positioned so that the mass in the high position strikes said inner wall perpendicularly.

2. The device as claimed in claim 1, wherein the number of inner faces is infinite, the target element includes an inner wall in the form of a truncated cone which is adapted to receive impacts of the mass at any position on an inner periphery thereof.

3. The device as claimed in one of claims 1 or 2, wherein said rigid cage includes columns adapted to slide vertically with respect to the chassis of the vehicle, said columns being interlocked together by a first rigid structure supporting the turret and the operating means, and by a second rigid structure connected to the target element by said deformable coupling means.

4. The device as claimed in claim 3, wherein said deformable coupling means include resilient elements interposed between said second rigid structure and the target element.

5. The device as claimed in claim 3, wherein said target element is in the form of a box with four sides, each of the four sides having inner dividing walls, said second rigid structure includes ribbed spacers penetrating inside the sides of the box and the deformable coupling means include first resilient elements disposed inside the sides of the box so that said second rigid structure rests on said first resilient elements when the target element is in the working position and second resilient elements also disposed inside the sides of the box between the dividing walls thereof and the spacers fixed to the second rigid structure so as to damp out all the components parallel to the face of application transmitted to the cage by the target element.

6. The device as claimed in claim 5, wherein said inner wall is made fast to the case by ribs fixed to the base plate and to the sides thereof.

7. The device as claimed in claim 3, wherein the cage includes four columns fixed at four different positions of the second structure, and said deformable coupling means are interposed between the target element and the second structure in the vicinity of these positions.

8. The device as claimed in claim 3, wherein the drive means include two cylinder means secured to the chassis of the vehicle, each of said cylinder means including rod means connected to the second structure of the rigid cage, said two cylinder means being fed by a hydraulic system.

9. The device as claimed in claim 4, wherein said resilient elements include envelopes made from a deformable material and filled with compressed air.

10. The device as claimed in claim 1, wherein the rotation means for rotating the turret include a crown gear fixed to the turret, which includes a plate, support elements fixed to the plate, and wherein the pivoting axis of the arm is fixed to said support elements.

11. The device as claimed in claim 1, wherein at least one shock absorbing element is fixed against at least one of the inner wall and the target element.

12. The device as claimed in claim 3, wherein the deformable coupling means includes bellows filled with compressed air, said bellows including a deformable lateral wall.

13. In a device for generating in the ground transverse acoustic waves, the device including a target element with a face for application on the ground and an inner plane striking wall, a mass for striking the target element on said inner striking wall, a turret, an arm pivoting in a plane with respect to said turret around a pivoting shaft for supporting the mass, an operating means for causing said arm to pivot with respect to the turret between a high position and a low position in which the mass comes into contact with the inner striking wall, said target element, said turret and said operating means being connected to a rigid cage associated with guide means fixed to the chassis of a vehicle and movable in translation with respect thereto between a first working position in which the target element is in contact with the ground and a second raised position, said rigid cage including columns adapted for sliding vertically with respect to the chassis of a vehicle, said columns being connected together by a first rigid structure supporting the turret and the operating means, and by a second rigid structure, the device further including drive means for moving said rigid cage with respect to the chassis between the first and second positions and for pressing said target element against the ground in the working position, wherein said target element includes a target member in the form of a box with four sides provided inwardly with said inner striking wall slanted with respect to the vertical and provided with a plurality of slanted faces oriented differently with respect to each other, rotational means are provided for causing the turret to rotate with respect to the target element, and for bringing said pivoting plane of said arm perpendicular to each of said slanted inner faces, the pivoting shaft of the arm being position so that the mass in the high position strikes said inner wall perpendicularly, each of said sides of said box includes inner dividing walls, said second rigid structure includes spacers penetrating inside the sides of the box, and deformable coupling means are provided which include first resilient elements disposed inside the sides of the box so that said second rigid structure rests on said first resilient elements when the target element is in the working position and second resilient elements are disposed inside in the sides of the box between the dividing wall thereof and the spacers fixed to the second rigid structure, and that a periphery of said slanted striking walls so as to damp out all of the components parallel to a face of application transmitted to the cage by the target element.

* * * * *